United States Patent [19]

Hölzer

[11] Patent Number: 4,504,068
[45] Date of Patent: Mar. 12, 1985

[54] SHAFT SEALING RING

[75] Inventor: Helmut Hölzer, Weinhem, Fed. Rep. of Germany

[73] Assignee: Firma Carl Freudenberg, Weinheim an der Bergstrasse, Fed. Rep. of Germany

[21] Appl. No.: 163,962

[22] Filed: Jun. 30, 1980

[30] Foreign Application Priority Data

Aug. 25, 1979 [DE] Fed. Rep. of Germany ....... 2934487

[51] Int. Cl.³ .............................................. F16J 15/32
[52] U.S. Cl. .................................. 277/164; 277/182
[58] Field of Search ............... 277/164, 149, 152, 181, 277/182, 183, 935 D, 159

[56] References Cited

U.S. PATENT DOCUMENTS

| 2,182,226 | 12/1939 | Geise | 277/182 |
| 2,608,425 | 8/1952 | Krug | 277/935 D |
| 3,029,083 | 4/1962 | Wilde | 277/164 |
| 3,561,770 | 2/1971 | Corsi | 277/164 |

Primary Examiner—Robert I. Smith
Attorney, Agent, or Firm—Kenyon & Kenyon

[57] ABSTRACT

In a shaft sealing ring including a stiffening ring having an angular profile, a lip ring with a sealing lip, an intermediate ring in the nature of a diaphragm connecting the lip ring to the stiffening ring and an elastic contact pressure element arranged to press the sealing lip resiliently against the surface of the sealed shaft, the contact pressure element is an extension from the stiffening ring protruding 40 to 80% into the cross section of the intermediate ring.

9 Claims, 3 Drawing Figures

SHAFT SEALING RING

BACKGROUND OF THE INVENTION

This invention relates to the sealing of shafts in general and more particularly to an improved shaft sealing ring.

A shaft sealing ring including a stiffening ring having an angular profile and a lip ring with a sealing lip connected thereto by an intermediate ring in the nature of a diaphragm and in which an elastic contact pressure element is provided for pressing the sealing lip resiliently against the surface of the sealed shaft is described in German Pat. No. 10 07 130. In the disclosed sealing ring, the lip ring has a groove at its outer circumference, in which a coil spring is embedded in the immediate vicinity of the sealing lip. The fabrication and assembly of this coil spring, however, results in an undesirable increase in the cost of the shaft sealing ring and it is often difficult to produce uniform contact pressure over the entire circumference. This is true particularly for small nominal diameters, where the hardening caused by the joining of the two ends of the coil spring extends over a zone which occupies a substantial percentage of the total circumference.

U.S. Pat. No. 2,267,930 teaches a shaft sealing ring in which the contact pressure element extends into the interior of the lip ring. More specifically the contact pressure element extends into the immediate vicinity of the sealing lip. However, the operating properties of this sealing ring have also not been found to be completely satisfactory. With this sealing ring good sealing results can be obtained, for instance, only if steps are taken to ensure that the sealed shaft is running absolutely true, and only if the specified outside diameter of the sealed shaft is maintained with the greatest precision. Both requirements cannot be met when ordinary manufacturing tolerances are maintained.

It is thus an object of the present invention to develop a shaft-sealing ring which, with ordinary assembly tolerances, ensures good sealing, which is inexpensive to manufacture and which in quantity production exhibits the greatest possible repeatability in the quality features of each unit.

SUMMARY OF THE INVENTION

According to the present invention, this problem is solved, in a shaft sealing ring of the type mentioned at the outset, by making the contact pressure element an extension of the stiffening ring, which extends 40 to 80% into the profile of the intermediate ring.

The support ring of the shaft sealing ring according to the present invention preferably consists of a deep-drawn piece of sheet steel. The deep drawing process used for fabricating the support ring permits, simultaneously with the general deformation, the development of the contact pressure element at the radially inwardly pointing leg. The manufacture of the stiffening ring required for the shaft sealing ring according to the present invention is therefore basically accomplished without extra cost as compared to conventional designs.

The length of the contact pressure element relative to the length of the profile of the intermediate ring is selected with reference to the design of a shaft sealing ring according to German Pat. No. 10 07 130 or DIN 3760, which resulted therefrom, Selection Sheet 1, May, 1972, Price Group 4. The lip ring is confined in the axial direction by a surface extending perpendicular to the axis of rotation. The ratio of the present invention refers to the distance of the surface facing the stiffening ring from the surface facing the lip ring of the radially inwardly extending leg of the profile of the stiffening ring.

The lip ring of the shaft sealing ring according to the present invention no longer has a groove on its outside circumference. As noted above, such was previously required for receiving a coil spring. The elimination of the flank surface required for the development of the groove results in savings with respect to the elastomer material required, as well as in an overall reduction of the mass of the parts which, during operation, continuously follow the motions of the sealed shaft. It is assumed that the excellent sealing results are due to this as well as to the relatively greater flexibility of the lip ring.

To improve the elastic properties of the extension in the projecting part according to a special embodiment of the present invention, the extension has less thickness in its projecting part than in the region of the radially inwardly pointing leg of the support ring. According to another advantageous embodiment, the extension is subdivided into individual segments by cuts uniformly distributed over the circumference. Optionally, particularly good results are often obtained in conjunction with or independently of the above-described tapering of the extension in the projecting part, if the segments in the projecting part are conically tapered in width. A particularly advantageous average width of the individual segments is 2 to 10 mm for shaft diameters of 20 to 100 mm. The spring-elastic behavior of the extension, effective in the radial direction, is substantially influenced by the angle between the extension and the axis of the shaft to be sealed. Especially advantageous are angles between 15° and 40°, preferably in the order of magnitude of 25°. Angles of 0° or negative angles, on the other hand, in some cases had a negative effect on the vibration behavior of the sealing lip during operation and, therefore, resulted in poor dynamic sealing.

All of these additional measures lead to an improvement of the elastic properties of the ring-shaped extension of the support ring and their use becomes more important, the farther the extension protrudes into the intermediate ring. In designs where the extension protrudes only slightly into the intermediate ring, such additional measures may be dispensed with.

DETAILED DESCRIPTION OF THE INVENTION

Figure 1:
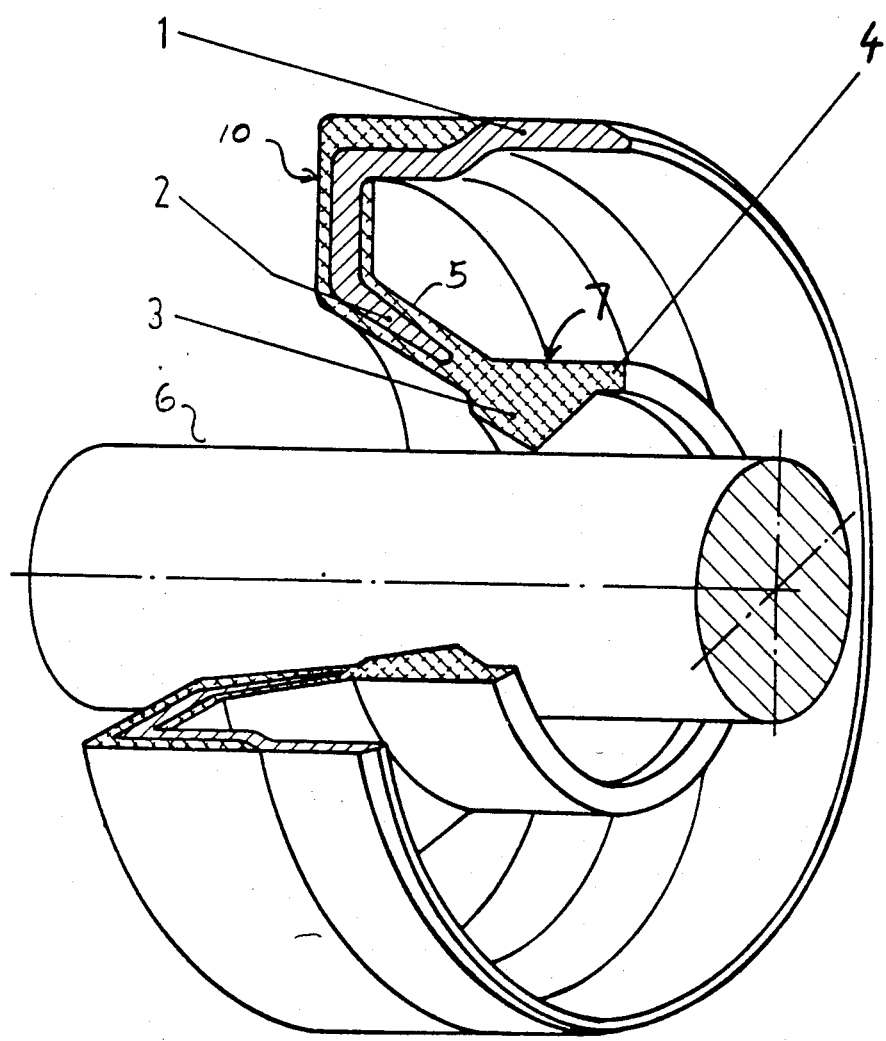
FIG. 1 is a perspective view, partially cut away, of the sealing ring of the present invention.

FIG. 1 shows the shaft sealing ring of the present invention in a partially cut-away perspective view. As illustrated, the shaft sealing ring includes a stiffening ring 1 of angular cross section, the radially inwardly pointing leg of which forms an extension 2. The extension 2 is completely embedded in an elastomer, generally indicated as 10, part of which forms an intermediate ring 5, in the nature of a diaphragm. Intermediate ring 5 connects an elastic lip ring, with a sealing lip 3 to the stiffening ring 1.

Figure 2:
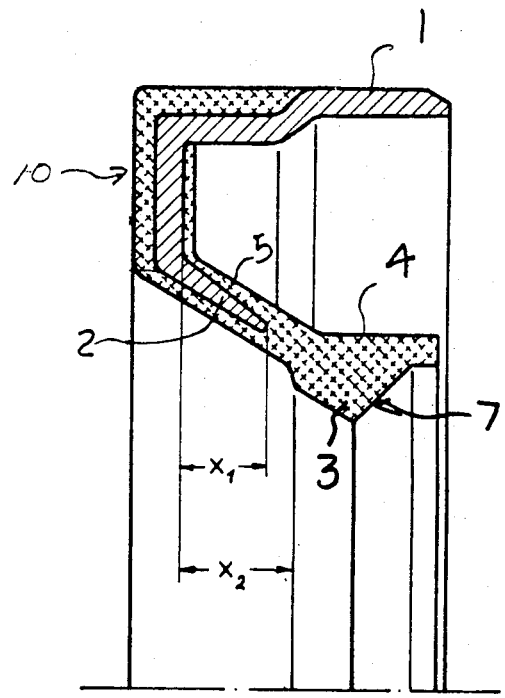
FIG. 2 is a cross section through the sealing ring of FIG. 1.

In FIG. 2, the sealing ring of FIG. 1 is shown in a full cross section in order to illustrate the ratio $x_1/x_2$, of the distance which the extension 2 projects into the profile of the intermediate ring 5 to the total dimension of this intermediate ring 5.

The ratio should be 0.4 to 0.8, i.e., the extension 2 should protrude into the intermediate ring 40% to 80% of its length. Also note that the extension 2 is tapered so that its inner end is of less thickness than the remainder.

The elastic contact pressure force of the sealing lip 3 onto the surface of the shaft 6 to be sealed off is determined in particular by the material properties and the dimensions of the extension of the support ring 1 and of the lip ring 7. Both parameters can be controlled and continously maintained very precisely without special difficulties in production runs. In addition, a modification of the elastic properties can be obtained by means of a projection 4 of defined length which extends in the axial direction. It is also of special advantage if this length can be reduced subsequently, if desired, by mechanical machining without thereby attacking the surface of the lip ring 7 in the portion of the sealing lip 3 which is important for the operation.

Figure 3:
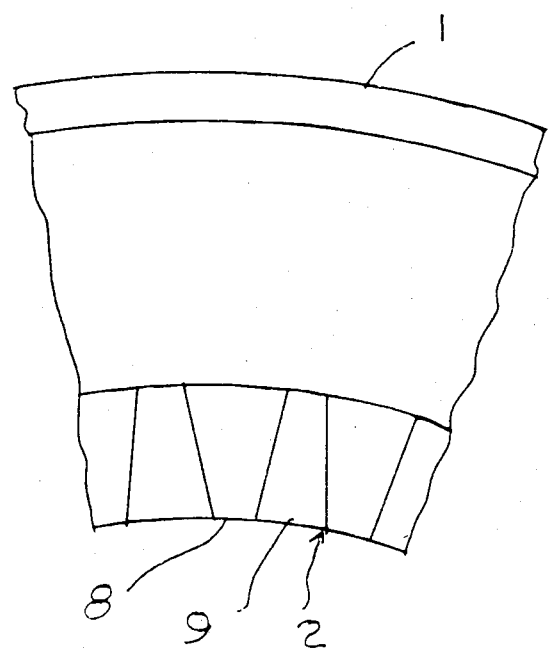
FIG. 3 is a partial elevation view of the stiffening ring of FIG. 2.

As shown by FIG. 3 which is a view of a part of stiffening ring 1, extension 2 may be subdivided into individual parts 8 by means of uniformly distributed cuts 9. Parts 8 are tapered so that they are narrower at their tips than at their bases.

The operating properties of the shaft sealing ring according to the present invention are at least equivalent to those of a design according to DIN 3760. The ease of production as well as the excellent repeatability of all properties of the individual unit is an advantage which distinguishes it from the other units.

What is claimed is:

1. In a shaft sealing ring including a stiffening ring having an angular profile, a lip ring with a sealing lip, means in the nature of a diaphragm attached to and connecting said lip ring to said stiffening ring and an elastic contact pressure means arranged to press the sealing lip resiliently against the surface of the sealed shaft, the improvement comprising the contact pressure means being an extension from the stiffening ring protruding 40 to 80% into the cross section of said means in the nature of a diaphragm.

2. The improvement according to claim 1, wherein said extension is tapered so as to have less thickness at its tip than at its base where it extends from said stiffening ring.

3. The improvement according to claim 1 or 2, wherein the angle between the inside surface of said extension and the axis of the shaft to be sealed is between 15° and 40°.

4. The improvement according to claim 3 wherein said angle is about 25°.

5. The improvement according to claim 3, wherein said extension is subdivided into individual segments by cuts uniformly distributed over its circumference.

6. The improvement according to claim 5, wherein said individual segments are tapered so as to be narrower at their tips than at their bases.

7. The improvement according to claim 1, wherein said extension is subdivided into individual segments by cuts uniformly distributed over its circumference.

8. The improvement according to claim 7, wherein said individual segments are tapered so as to be narrower at their tips than at their bases.

9. A shaft sealing ring comprising:
   (a) a stiffening ring having an angular profile;
   (b) a lip ring with a sealing lip;
   (c) means in the nature of a diaphragm attached to and connecting said lip ring to said stiffening ring; and
   (d) an extension from said stiffening ring protruding 40 to 80% into the cross section of said means in the nature of a diaphragm to press said sealing lip resiliently against the surface of the sealed shaft.

* * * * *